United States Patent [19]

Koscik

[11] 3,889,320

[45] June 17, 1975

[54] HEADLINER/MOLDING RETAINER AND METHOD OF INSTALLING SAME

[75] Inventor: Richard Allen Koscik, Richton Park, Ill.

[73] Assignee: Illinois Tool Works Inc., Chicago, Ill.

[22] Filed: Apr. 1, 1974

[21] Appl. No.: 456,818

[52] U.S. Cl. .............................. 24/73 PM; 85/5 R
[51] Int. Cl.² .................... A44B 21/00; F16B 19/00
[58] Field of Search ............ 24/73 P, 73 PF, 73 PM, 24/73 FT; 85/5 R; 29/428; 52/22

[56] References Cited
UNITED STATES PATENTS

| | | | |
|---|---|---|---|
| 2,713,284 | 7/1955 | Bedford | 85/5 R |
| 3,093,874 | 6/1963 | Rapata | 85/5 R X |
| 3,485,133 | 12/1969 | Rapata | 85/5 R |
| 3,550,217 | 12/1970 | Collyer | 24/73 PF |
| 3,651,545 | 3/1972 | Hara | 24/73 P |
| 3,811,154 | 5/1974 | Lindeman et al. | 24/73 P |

FOREIGN PATENTS OR APPLICATIONS 1,135,470  12/1968  United Kingdom ............. 24/73 PM Primary Examiner—Donald A. Griffin
Attorney, Agent, or Firm—Olson, Trexler, Wolters, Bushnell & Fosse, Ltd.

[57] ABSTRACT

A one-piece headliner and molding retainer is provided for securing a headliner assembly adjacent the roof of an automobile. The roof structure is provided with an oval aperture having mutually perpendicular major and minor axes. An arrowhead-shaped mounting portion of the retainer includes two wings whose free ends abut roof structure adjacent the minor oval axis. A spacer extends along the major oval axis to secure the retainer to the roof in a direction perpendicular to the minor oval axis. A retainer leaf and a show member are biased toward one another to pinch and retain headliner members between them. A molding member is attached over the retainer shoe to provide a neat, finished appearance for the headliner assembly.

11 Claims, 4 Drawing Figures

PATENTED JUN 17 1975 3,889,320
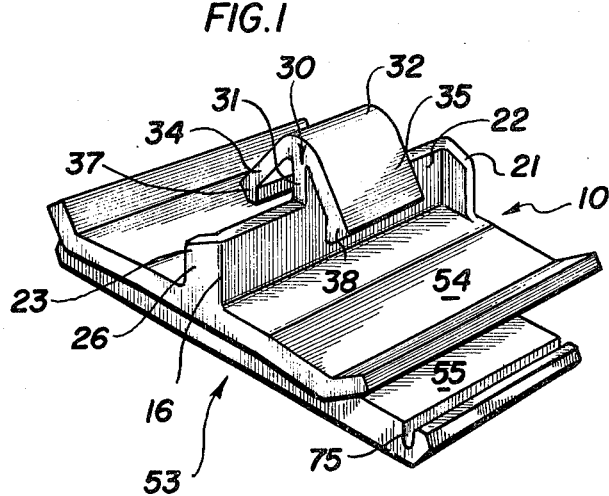
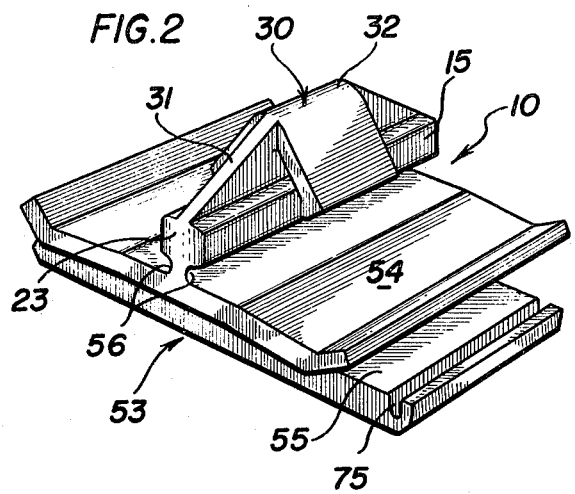
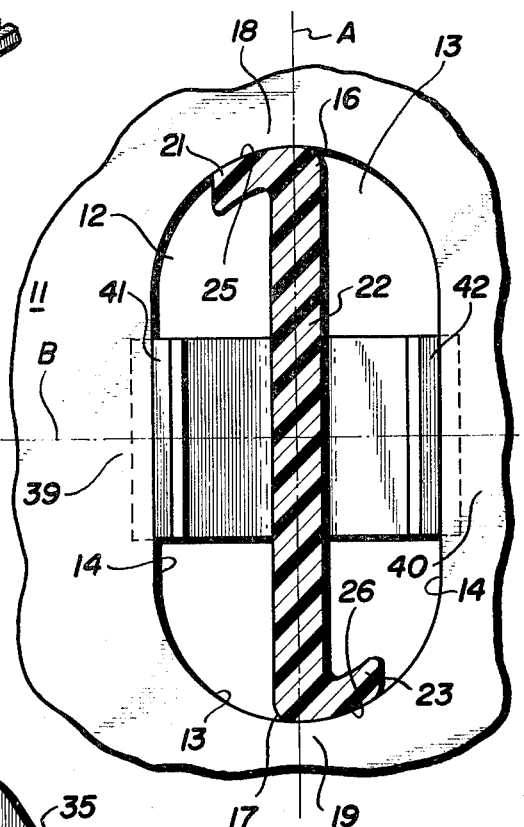
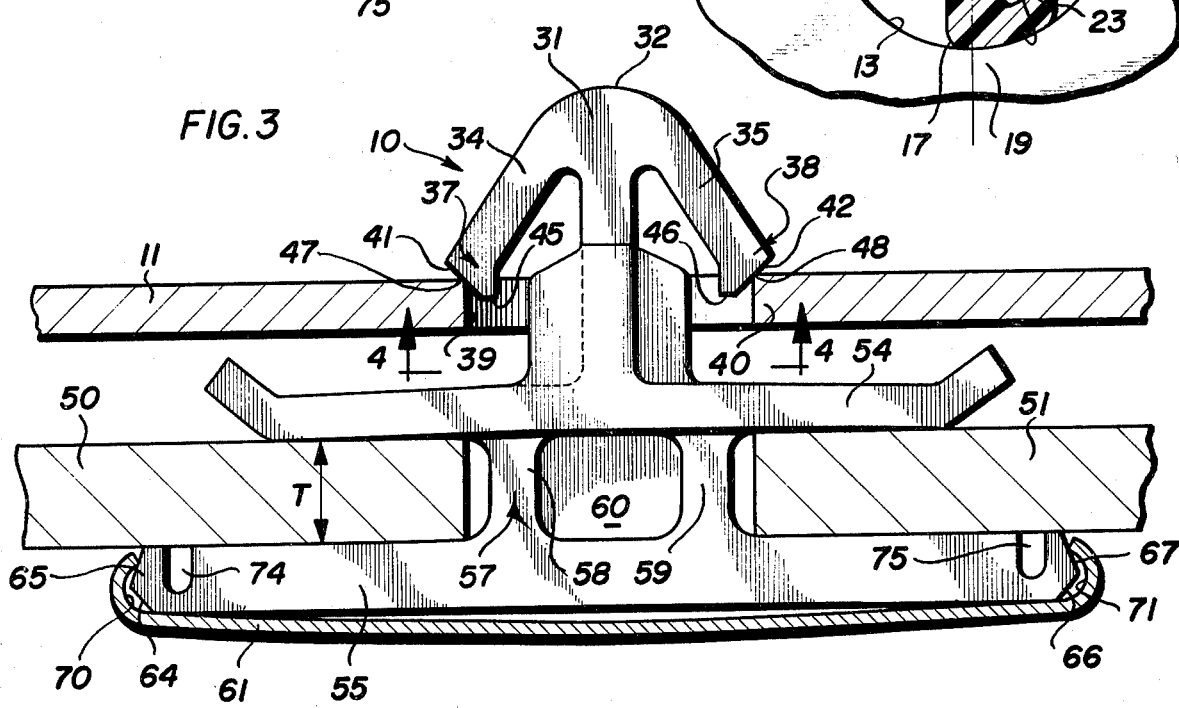

HEADLINER/MOLDING RETAINER AND METHOD OF INSTALLING SAME

BACKGROUND OF THE INVENTION

This invention relates generally to fasteners, and more particularly concerns a device for retaining a headliner and molding member adjacent a structure such as the roof of an automobile or the like.

The general object of the present invention is to provide an inexpensive yet effective device for positively retaining one or more headliner members adjacent an automobile roof or in a like location.

Another object is to provide a headliner and molding retainer and fastener which is simple to insert into a hole in the roof interior, and which will hold the headliner adjacent the auto roof with security and permanency. A related object is to provide such a retainer which can be installed quickly and at low cost by even inexperienced assembly personnel. An auxiliary object is to provide a quick and simple method of installing the retainer, the headliner assembly and a retainer-covering molding member.

A further object is to provide a headliner and molding retainer which is especially adapted for use with a roof or like foundation provided with an oval fitting hole. A related object is to provide a retainer which is secured to and within the roof by abuttive attachment to roof structure surrounding and defining the oval hole.

Other objects and advantages of the invention will become apparent upon reading the following detailed description and upon reference to the drawings. Throughout the drawings, like reference numerals refer to like parts.

BRIEF DESCRIPTION OF THE DRAWINGS

FIG. 1 is a perspective view showing, in overall aspect, one embodiment of the novel retainer;

FIG. 2 is an overall perspective view similar to FIG. 1, but showing a slightly modified embodiment of the invention;

FIG. 3 is an elevational view of the retainer shown in FIG. 1 illustrating in further detail the retainer, the supporting auto roof or like structure, the headliner members and the covering molding member; and FIG. 4 is a sectional view taken substantially in the plane of line 4—4 in FIG. 3 and showing in further detail the embodiment of the invention shown in FIG. 1.

DETAILED DESCRIPTION

While the invention will be described in connection with a preferred embodiment and procedure, it will be understood that it is not intended to limit the invention to this embodiment or procedure. On the contrary, it is intended to cover all alternatives, modifications and equivalents as may be included within the spirit and scope of the invention.

Turning more specifically to the drawings, there is shown the novel retainer device 10 of the present invention which is adapted for use with a support structure which here takes the form of an automobile roof 11. To lower manufacturing costs in accordance with one aspect of the invention, this retainer 10 is formed as a single piece of suitable plastic material. The roof member 11 is provided with an aperture or hole 12 adapted to assist in mounting the retainer 10. In the illustrated embodiment, the hole 12 is oval-shaped, and is symmetrical about a relatively elongated major axis A and a perpendicularly oriented minor axis B. The oval hole 12 shown herein will be understood to include opposed semicircular ends 13 and opposed, interconnecting straight edges 14.

The retainer 10 is precisely located and fitted to the hole 12 in the direction of the major axis A of the oval 12 in accordance with the invention. To accomplish this, a bi-ended spacer 15 is provided which extends along the major axis A and abuts at each end 16 and 17 adjacent aperture-defining structural material 18 and 19. In the first embodiment of the invention illustrated particularly in FIGS. 1, 3 and 4, this spacer is Z-shaped, and includes a first portion 21 extending asymmetrically away from the major axis A in one direction, a second or midportion 22 which is generally bilaterally symmetrical about the axis A, and a third portion 23 which extends asymmetrically away from the axis A in a direction opposite to the first portion 21. As illustrated particularly in FIG. 4, the first and third spacer portions are provided with rounded outer surfaces 25 and 26 rspectively adapted to engage the oval-defining structure over a somewhat extended distance to provide a secure, firm and precise fit.

A slightly modified embodiment of the invention shown in FIG. 2 is provided with a relatively rectangular spacer 15 which extends symmetrically away from the major axis A along its entire length.

In further accordance with the invention, retainer parts are provided to secure the fastener to the oval aperture-defining roof structure 11 in a direction parallel to the minor axis B. In the illustrated embodiments, this structure includes a generally arrow-shaped configuration 30, which comprises a stem 31 projecting away from the spacer 15 to a free end 32. Two opposed wings 34 and 35 extend outwardly and downwardly away from the stem free end 32 on each side of the stem in a diagonal direction.

Each of these planar wings 34 and 35 terminates in a straight-edged free end 37 and 38 adapted to abuttively engage the straight edges 14 of oval-defining roof structure material 39 and 40. As shown in FIG. 4, this structure-wing end engagement occurs adjacent the minor oval axis B. It is a feature of the invention that these wing free ends 37 and 38 are each provided with first surfaces 41 and 42 oriented generally perpendicularly to the direction in which the wings 34 and 35 extend, to positively and abuttingly confront the oval-defining structural straight edges 14. This abuttive or confrontive relationship between the retainer wing tips and the auto roof prevents slippage or misalignment of the retainer and attached members, and provides strong retainer-roof interconnection. Minor wing tip surfaces 45 and 46 are oriented to engage adjacent external roof surfaces 47 and 48 should misalignment occur, or if it is desired to use the fastener with a smaller oval hole.

In accordance with another aspect of the invention, the retainer 10 attaches to headliner members 50 and 51 to the roof 11. To accomplish this, a retainer head 53 includes a leaf member 54 extending laterally outwardly from the spacer 15 and parallel to the roof 11, as illustrated in FIG. 3. Below the leaf 54 is located a shoe 55 which is planar in configuration and is oriented substantially parallel to the leaf 54 and roof 11. If desired, flexibility between the leaf 54 and spacer 15 can be provided by forming recesses 56 between these two retainer parts. To pinch and retain the headliner members 50 and 51 between the leaf 54 and shoe 55 with a firm grip, the leaf and shoe are formed so as to slightly converge in their unstressed state, but they are biased away from one another into the illustrated generally parallel configuration when the headliner members are slipped between them. This configuration also allows headliners of various thicknesses T to be accommodated by a single size of retainer.

Interposed between the leaf 54 and the shoe 55 is an extension structure 57 which is of a height substantially equal to the thickness T of the headliner member 50. This extension 57 can be of any suitable configuration, but here is H-shaped and comprises two longitudinal webs 58 and 59 which extend generally parallel to the oval major axis A, and a cross-web portion 60 extending generally parallel to the oval minor axis B.

It is another feature of the invention that the retainer 10 mounts a molding member 61 over itself and adjacent portions of the headliner assembly parts 50 and 51. To accomplish this, the shoe 55 is provided with spaced apart, oppositely directed faces 64-67, inclusive. These surfaces 64-67 are oriented and adapted to engage interior surfaces 70 and 71 formed on the channel-shaped molding member 61. Depressions or recesses 74 and 75 permit the faces 64-67 to be resiliently flexed into engagement with the interior molding member surfaces 70 and 71.

Use of the retainer is easy. First, the two headliner members are inserted between the leaf 54 and the shoe 55, and are pinched and retained as shown in FIG. 3. Next, the mounting means arrowhead 30 is pushed into and through the roof oval aperture 12 to project above the roof member 11. This action permits the wings 34 and 35 to spring into the positions illustrated with the ends 37 and 38 located in an imaginary plane parallel to the leaf 54 and shoe 55 and extending through the spacer 15. Pushing the retainer 11 toward and through the roof oval 12 as described also forces the mounting means spacer 15 into and partially through the oval into its illustrated position. Thereafter, the molding member 61 is attached to cover dirt or tool marks on the retainer 10 and to present a neat, finished appearance.

The invention is claimed as follows:

1. A one-piece headliner retainer adapted to be applied to an aperture-defining structure such as an auto roof, the aperture being symmetrical about two mutually perpendicular axes, the retainer including a bi-ended spacer adapted to extend along a first aperture axis, each spacer end adapted to abut aperture-defining structure adjacent the first aperture axis, a stem projecting from the spacer, at least one wing extending away from the stem and having a free end adapted to abut aperture-defining structure adjacent a second axis, a rectangular, laterally extending leaf extending the length of the spacer and carried in substantially fixed relation to the spacer on a side opposite the stem, a rectangular shoe oriented substantially parallel to the leaf, but spaced apart therefrom, molding member retention means formed on two opposite sides of the rectangular shoe to receive and retain a molding member thereover, an extension interposed between the leaf and shoe of a height substantially equal to the thickness of a headliner member to be pinched between the leaf and the shoe, and recess structure interposed between the leaf and the spacer to locate the leaf at a position spaced apart from the auto roof, whereby flexibility between the leaf, the auto roof and the spacer is provided.

2. A headliner according to claim 1 wherein said spacer is Z-shaped in cross-sectional aspect, and includes a first portion extending asymmetrically away from the first axis in one direction, a second portion extending symmetrically away from the first axis, and a third portion extending asymmetrically away from the first axis in a direction opposite to the first portion.

3. A headliner retainer adapted to be applied to an oval aperture-defining structure such as an auto roof, the oval aperture being symmetrical about a major axis and a perpendicular minor axis, the retainer including a bi-ended spacer adapted to extend along the major axis of the oval, each spacer end adapted to abut oval aperture-defining structure adjacent the major axis of the oval, a stem projecting from the spacer, at least one wing extending away from the stem and having a free end adapted to abut oval aperture-defining structure adjacent the minor axis, a laterally extending leaf carried in substantially fixed relation to the spacer on a side opposite the stem, a shoe oriented substantially parallel to the leaf, but spaced apart therefrom and adapted to receive and retain a molding member thereover, and an extension interposed between the leaf and shoe of a height substantially equal to the thickness of a headliner member to be pinched between the leaf and the shoe.

4. A headliner retainer according to claim 3 which is additionally adapted to retain a channel-shaped molding member, said shoe being provided with spaced apart sets of oppositely directed faces for engaging reversely turned, mutually opposed, spaced apart interior molding member surfaces to retain the molding member upon the headliner retainer.

5. A headliner retainer according to claim 4 wherein said shoe is provided with a depression behind each molding member-engaging face to provide resiliency to the molding member-shoe engagement.

6. A headliner retainer according to claim 3 wherein said spacer is substantially rectangular in cross-sectional aspect, and extends symmetrically away from said major axis of the oval.

7. A headliner according to claim 3 wherein said spacer is Z-shaped in cross-sectional aspect, and includes a first portion extending asymmetrically away from the major oval axis in one direction, a second portion extending symmetrically away from the major oval axis, and a third portion extending asymmetrically away from the major oval axis in a direction opposite to the first portion.

8. A headliner retainer according to claim 3 including two wings, one wing extending away from each side of the stem in the direction of the minor axis of the oval.

9. A headliner retainer according to claim 8 wherein said wings are generally planar in shape, and wherein said wing free ends have a substantially straight edge adapted to engage the aperture-defining structure along a substantially straight line of contact oriented parallel to the major oval axis.

10. A headliner retainer according to claim 8 wherein said stem free end projects above the aperture-defining structure, and wherein said wings depend outwardly and downwardly from the stem free end in arrowhead-shaped configuration to engage the aperture-defining structure.

11. A headliner retainer according to claim 10 wherein said wing free ends are adapted to engage the aperture-defining structure at the aperture edge along a substantially straight line.

* * * * *